United States Patent
Kiser et al.

(10) Patent No.: US 6,687,560 B2
(45) Date of Patent: Feb. 3, 2004

(54) PROCESSING PERFORMANCE DATA DESCRIBING A RELATIONSHIP BETWEEN A PROVIDER AND A CLIENT

(75) Inventors: Charles H. Kiser, Dallas, TX (US); Cheryl L. Clinton, Denton, TX (US); John T. Couchot, McKinney, TX (US); Anne M. Curtin, Richardson, TX (US); Joseph M. Donovan, San Diego, CA (US); Steven C. Dorfmeister, McKinney, TX (US); Brian L. Fish, McKinney, TX (US); Lisa Q. Flores, Frisco, TX (US); William M. Gerton, Frisco, TX (US); James D. Hall, Plano, TX (US); Jaye D. Hicks, Frisco, TX (US); Sonya L. Hinds, Frisco, TX (US); Randall F. Mears, Plano, TX (US); Rodney B. Morris, Plano, TX (US); Deborah C. Peedin, Cary, NC (US); Kevin T. Richards, Allen, TX (US); Cynthia B. Sargeant, Frisco, TX (US); Michael W. Stuart, Plano, TX (US); Michael J. Veatch, Richardson, TX (US); Laura L. Wetzel, The Colony, TX (US); Gene C. Will, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 81 days.

(21) Appl. No.: 10/008,098

(22) Filed: Nov. 13, 2001

(65) Prior Publication Data

US 2003/0065479 A1 Apr. 3, 2003

Related U.S. Application Data

(60) Provisional application No. 60/324,647, filed on Sep. 24, 2001.

(51) Int. Cl.[7] .............................................. G06F 19/00
(52) U.S. Cl. ........................ 700/108; 709/224; 714/47
(58) Field of Search ............................. 700/108; 707/6; 709/224, 203; 714/47

(56) References Cited

U.S. PATENT DOCUMENTS

| 4,726,056 A | | 2/1988 | An et al. |
| 5,185,785 A | | 2/1993 | Funk et al. |
| 5,734,890 A | * | 3/1998 | Case et al. ..................... 707/6 |

(List continued on next page.)

OTHER PUBLICATIONS

*Informix Product Family*, IBM Software: Database and Data Management: Informix Product Family: Overview; http://www-4.ibm.com/software/data.informix/, Oct. 17, 2001, 1 page.

*Solutions: Business Intelligence*, IBM Software: Database and Data Management: Informix Product Family: Business Intell, http://www-4.ibm.com/software/data/informix/solutions/bi.html, Oct. 17, 2001, 1 page.

*Informix Product Family: Solutions*, IBM Software: Database and Data Management: Informix Product Family: Solutions, http://www-4.ibm.com/software/data/informix/solutions/, Oct. 17, 2001, 2 pages.

(List continued on next page.)

Primary Examiner—Albert W. Paladini
(74) Attorney, Agent, or Firm—Baker Botts L.L.P.

(57) ABSTRACT

Processing performance data includes receiving performance data comprising quantitative data gathered according to at least one metric. The quantitative data is evaluated according to the at least one metric to generate at least one quantitative data rating. Performance data comprising client data gathered from a client is received and evaluated to generate at least one client data rating. Performance data comprising provider data gathered from a provider is received and evaluated to generate at least one provider data rating. The at least one quantitative data rating, the at least one client data rating, and the at least one provider data rating are reported.

43 Claims, 11 Drawing Sheets

U.S. PATENT DOCUMENTS

| | | | |
|---|---|---|---|
| 5,758,071 A | | 5/1998 | Burgess et al. |
| 5,905,868 A | | 5/1999 | Baghai et al. |
| 5,923,741 A | | 7/1999 | Wright et al. |
| 5,926,794 A | | 7/1999 | Fethe |
| 6,112,239 A | | 8/2000 | Kenner et al. |
| 6,157,618 A | * | 12/2000 | Boss et al. .................. 709/224 |
| 6,205,413 B1 | * | 3/2001 | Bisdikian et al. ........... 709/224 |
| 6,247,050 B1 | * | 6/2001 | Tso et al. ................... 709/224 |
| 6,418,467 B1 | | 7/2002 | Schweitzer et al. |
| 6,449,588 B1 | | 9/2002 | Bowman-Amuah |
| 6,484,169 B1 | * | 11/2002 | Wilsford ........................ 707/6 |
| 6,522,247 B2 | * | 2/2003 | Maruyama et al. ......... 340/506 |

OTHER PUBLICATIONS

*Solutions: Transactions (OLTP)*, IBM Software: Database and Data Management: Informix Product Family: Transactions, http://www-4.ibm.com/software/data/informix/solutions/oltp.html, Oct. 17, 2001, 1 page.

*Inforay Procurement Monitors*, http://www.inforay.com/main.html, Oct. 17, 2001, 6 pages.

*mySAP Financials—Strategic Enterprise Management*, SAP The Best–Run E–Businesses Run SAP, SAP—Strategic Enterprise Management, http://www.sap.com/sem/, 2001 SAP AG., 32 pages.

*Consulting and Training Services*, Tenacity Client Retention Consultants, http://www.accountingmanagement.com/consulting training/mid.html, Oct. 18, 2001, 7 pages.

*Electronic Survey Software*, Survey Software, Online Surveys, Web Surveys, Customer Surveys and Questionaires, Catapult Systems Corp., http://www.inquisitesurveysoftware.com/inq8, Oct. 18, 2001, 8 pages, 1997–2001.

*Global Carrier Uses Real–Time Feedback from Satmetrix Systems to Drive Organization Change*, Satmetrix Systems, Inc., Customer Success Story, Cable & Wireless, http://www.satmetrix.com/public/solution/products/rel.html, Oct. 24, 2001, 5 pages.

\* cited by examiner

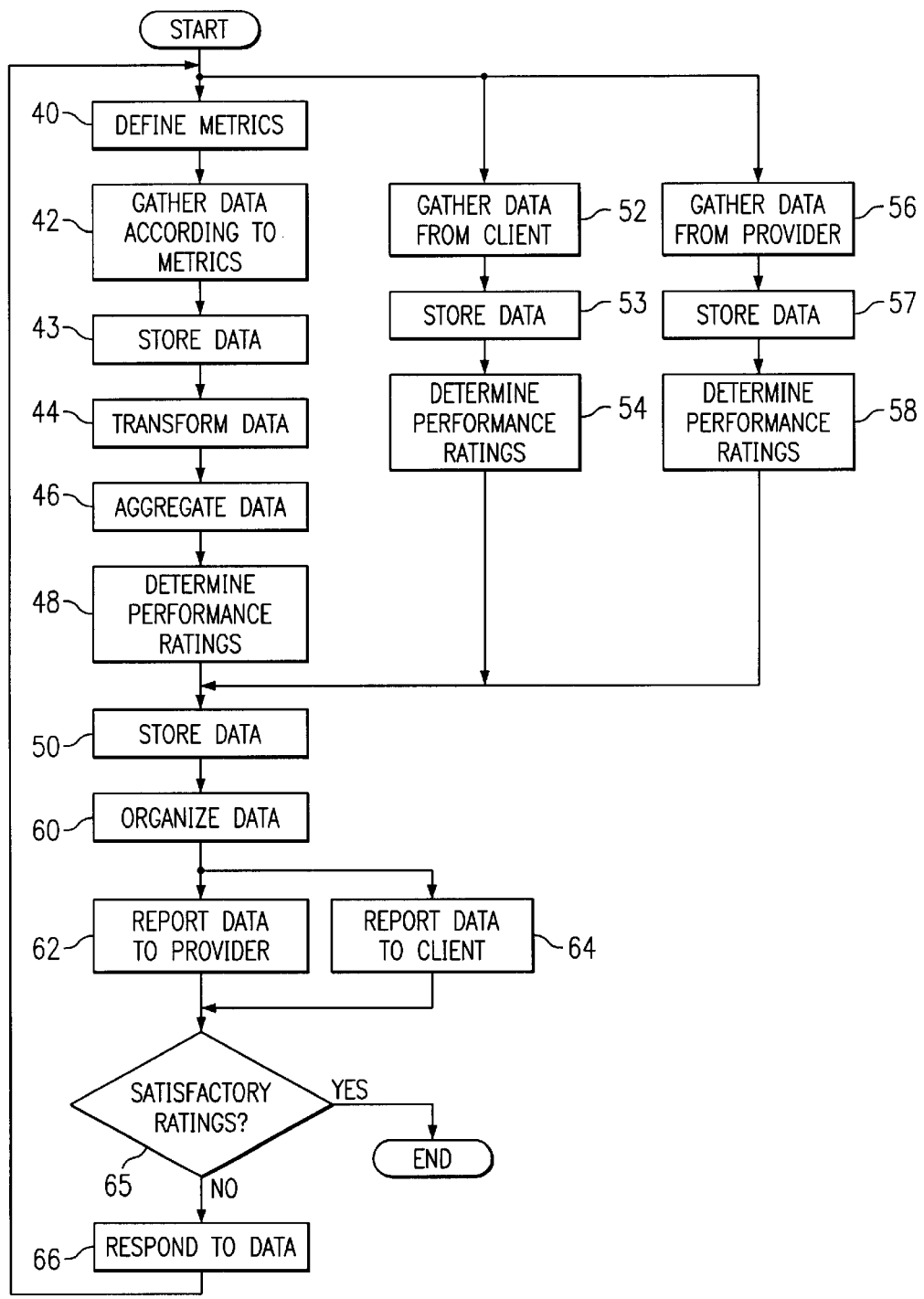

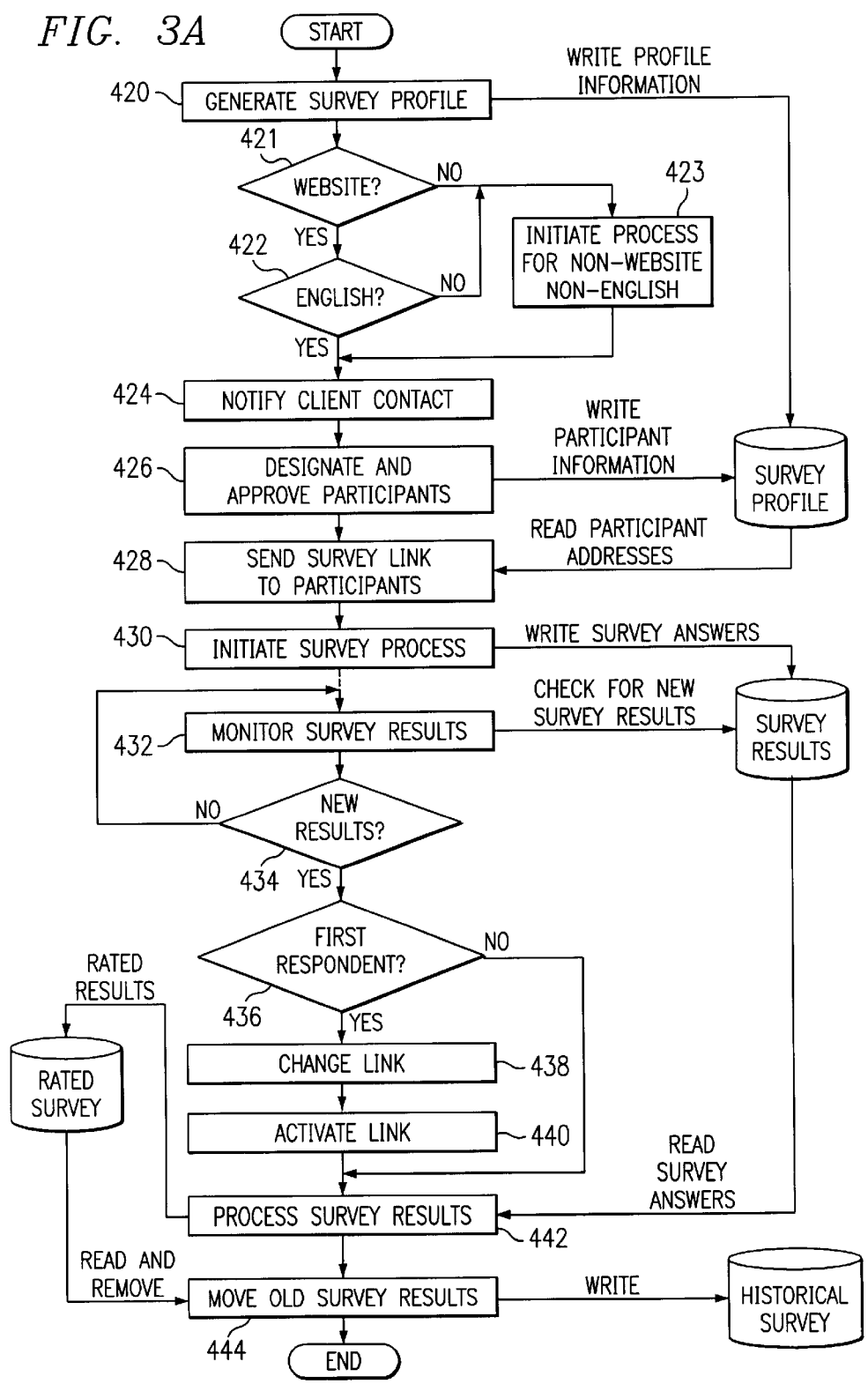

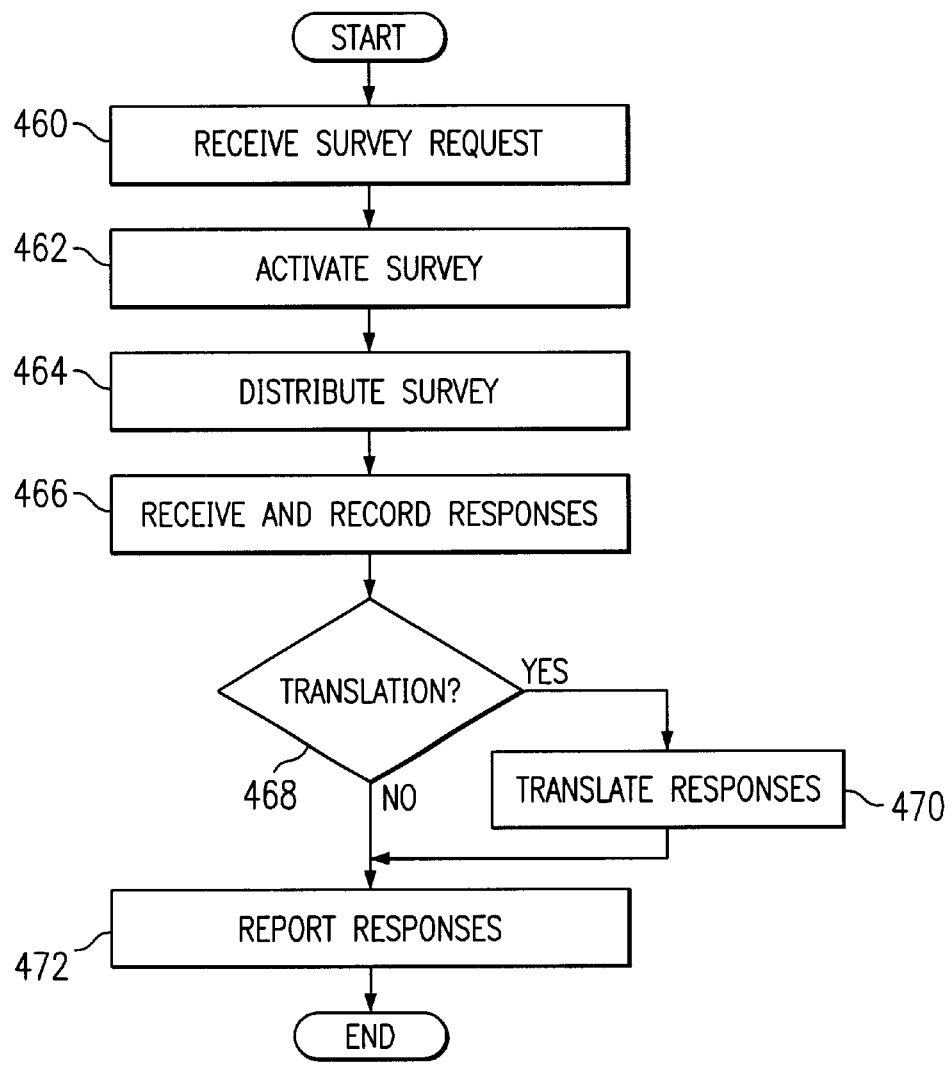

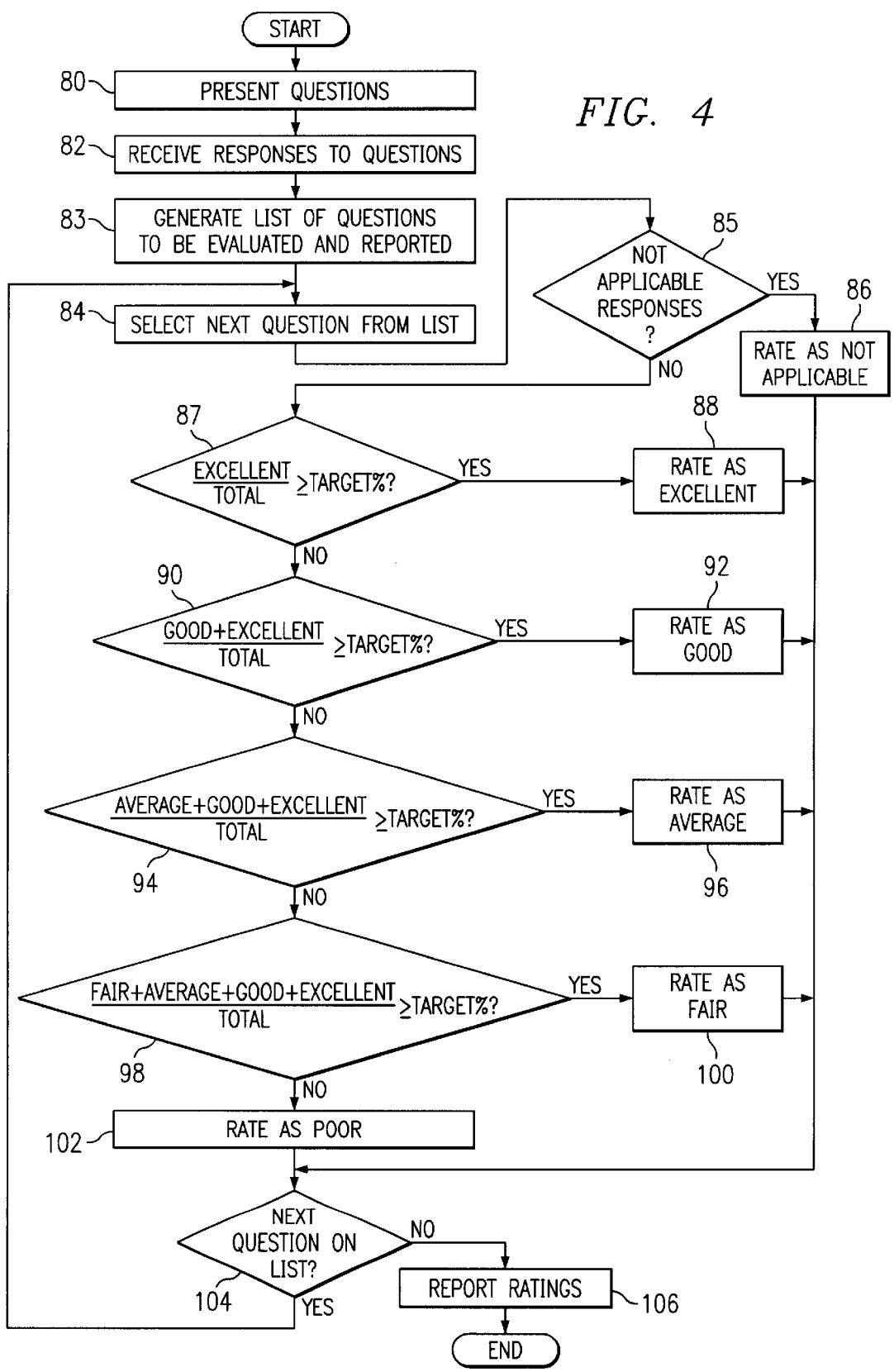

PROCESSING PERFORMANCE DATA DESCRIBING A RELATIONSHIP BETWEEN A PROVIDER AND A CLIENT

RELATED APPLICATIONS

This application claims benefit under 35 U.S.C. §119(e) of U.S. Provisional Application Serial No. 60/324,647, entitled "PROCESSING PERFORMANCE DATA DESCRIBING A RELATIONSHIP BETWEEN A PROVIDER AND A CLIENT," Attorney's Docket 93-01-006, filed Sep. 24, 2001.

This application claims benefit under 35 U.S.C. §120 of U.S. patent application Ser. No. 09/746,594, entitled "PERFORMANCE MEASUREMENT SYSTEM AND METHOD," Attorney's Docket 50-00-004, filed Dec. 21, 2000.

TECHNICAL FIELD OF THE INVENTION

This invention relates generally to the field of performance evaluation and more specifically to processing performance data describing a relationship between a provider and a client.

BACKGROUND OF THE INVENTION

Effective communication between a provider and a client may improve the relationship between the provider and the client. For example, a provider that provides a service to a client may receive feedback from the client that may be used to improve the service. Communication between a provider and a client, however, typically becomes more difficult as the provider's client base grows.

SUMMARY OF THE INVENTION

In accordance with the present invention, a method, a system, and logic for processing performance data are provided that substantially eliminate or reduce the disadvantages and problems associated with previously developed techniques.

According to one embodiment of the present invention, processing performance data includes receiving performance data comprising quantitative data gathered according to at least one metric. The quantitative data is evaluated according to the at least one metric to generate at least one quantitative data rating. Performance data comprising client data gathered from a client is received and evaluated to generate at least one client data rating. Performance data comprising provider data gathered from a provider is received and evaluated to generate at least one provider data rating. The at least one quantitative data rating, the at least one client data rating, and the at least one provider data rating are reported.

Certain embodiments of the invention may provide the following technical advantages. A technical advantage of one embodiment may be that performance data describing the actual performance of a provider, performance data gathered from a client, and performance data gathered from the provider may be readily accessed and displayed. Displaying the performance data from the different sources may allow a user to effectively identify inconsistent views about the state of the relationship, which may allow a provider to address problems and thus enhance the relationship. Another technical advantage of one embodiment may be that the performance data is displayed in real-time. Displaying the performance data in real-time may allow a provider to monitor the pulse of the relationship and to respond quickly to a problem or to client feedback. Displaying the performance data may also allow a provider to readily track the progress of a response to a problem.

Another technical advantage of one embodiment may be that the performance data may be reported to a provider and a client. Reporting the data to both a provider and a client may improve communication and understanding between the client and the provider, and may establish a feeling of trust between the client and provider. The client may also gain insight into the provider's performance. Another technical advantage of one embodiment may be that the performance data may be evaluated according to a metric to generate a quantitative data rating. The quantitative data rating may be displayed along with ratings generated from qualitative data gathered from the client and the provider in order to present a description of the relationship between the provider and the client. Another technical advantage of one embodiment may be that referenceability may be measured. A provider may use a good referenceability rating to attract additional clients.

Another advantage of one embodiment may be that data may be aggregated and disaggregated with respect to attributes such as client geography or industry, service line or offering, service location, or point of delivery. Performance data for a large number of clients may be combined with respect to common features to provide consistent and reconcilable answers to a variety of business questions, such as: What are the key drivers of client satisfaction? Which clients are affected by a problem originating in a single service line or point of delivery?

Consequently, certain embodiments of the invention may allow a provider to provide "Service Excellence" to a client.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 is a flowchart illustrating one example of a method for processing performance data;

FIGS. 3A and 3B are flowcharts illustrating one example of a process for gathering client data or provider data;

FIG. 4 is a flowchart illustrating one example of a method for evaluating client data or provider data;

DETAILED DESCRIPTION OF THE DRAWINGS

Figure 1:
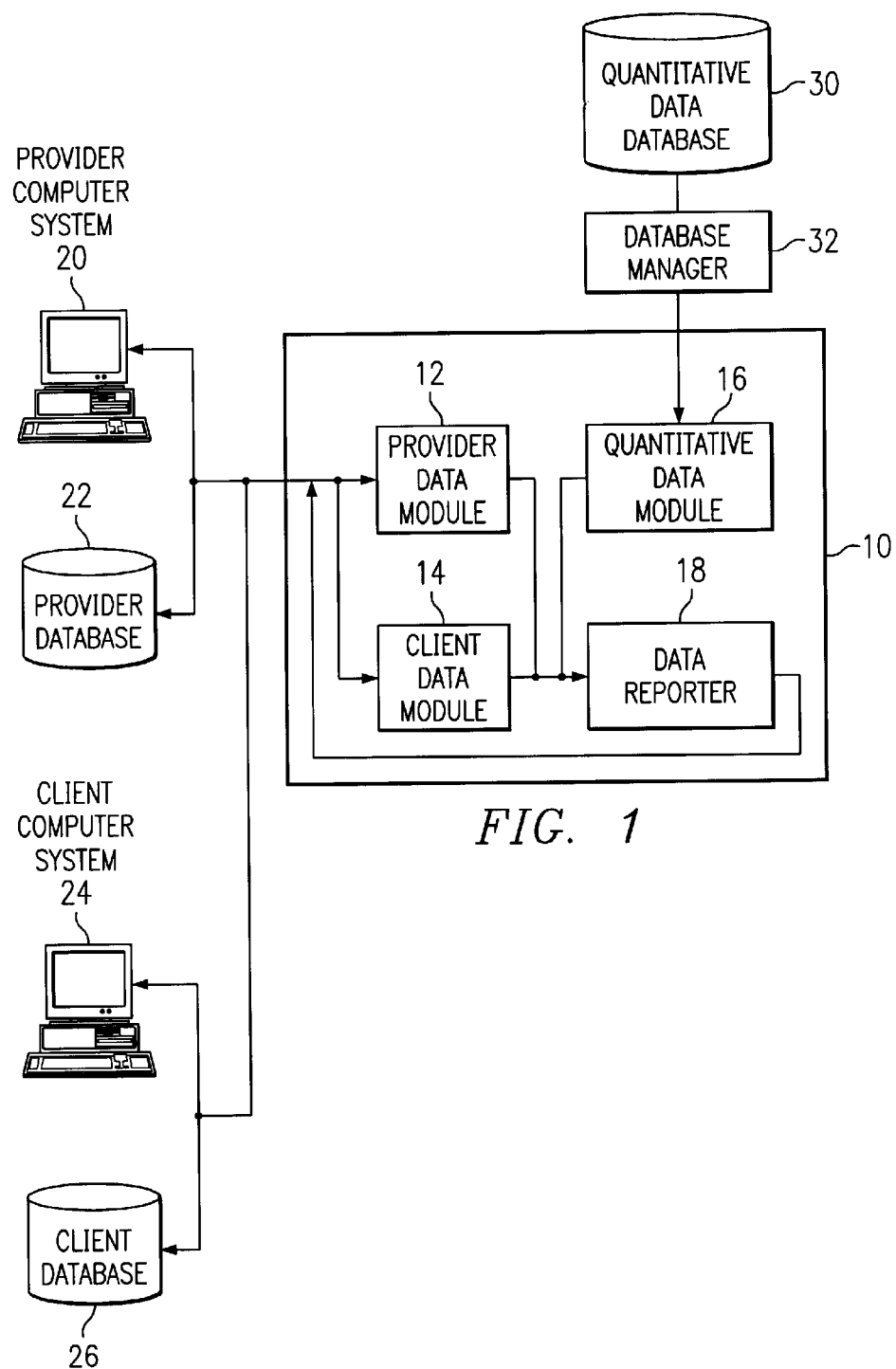
FIG. 1 is a block diagram of an example of a system for processing performance data.

FIG. 1 is a block diagram of an example of a system 10 for processing performance data. System 10 receives performance data describing a relationship between a provider and a client. The relationship may involve, for example, a service or product that the provider provides to the client. In the illustrated example, a service provider provides a service to the client.

Performance data may include qualitative data such as client data gathered from the client that describes the client's perspective of the service and provider data gathered from the provider that describes the provider's perspective of the service. Qualitative data may include performance perception data. The performance data may include quantitative data comprising measurements of the service taken with respect to a number of metrics. Quantitative data may include actual performance data. The performance data may comprise information from any combination of some or all of these types of data: client data, provider data, and quantitative data. System 10 evaluates and reports the performance data to the provider and/or the client. A method for processing performance data using system 10 is described in more detail with reference to FIG. 2.

Referring to FIG. 1, system 10 includes a provider data module 12, a client data module 14, a quantitative data module 16, and a data reporter 18. System 10 receives data from a provider computer system 20, a client computer system 24, and a quantitative data database 30.

Provider computer system 20 may gather and send performance data generated by a provider, and may also be used to report evaluated performance data. A client computer system 24 may gather and send performance data generated by a client, and may also be used to report evaluated performance data. Application security, operating system security, digital certificates, or other suitable security measures may be used to restrict user access to the performance data. For example, a provider may not want a client to access specific comments describing the client.

Quantitative data database 30 stores quantitative data, which may include measurements of the service. Database manager 32 manages the data of quantitative data database 30. A provider database 22 may be used to store performance data. A client database 26 may be used to store performance data. Databases 22, 26, and 30 may be combined or other databases or database configurations may be used without departing from the scope of the invention.

Provider computer system 20 and client computer system 24 may include appropriate input devices, output devices, mass storage media, processors, memory, or other components for receiving, processing, storing, and/or communicating information. As used in this document, the term "computer" is intended to encompass a personal computer, workstation, network computer, wireless data port, wireless telephone, personal digital assistant, one or more processors within these or other devices, or any other suitable processing device.

Provider data module 12 receives performance data from provider computer system 20, and processes and evaluates the data. Client data module 14 receives client performance data from client computer system 24, and processes and evaluates the data. Provider data module 12 and client data module 14 may receive performance data using any suitable data path. An example of processing and evaluating data that may be used by provider computer system 20 and/or client computer system 24 is described with reference to FIG. 4.

Quantitative data module 16 receives quantitative data from quantitative data database 30. Quantitative data module 16 processes and evaluates quantitative data. Quantitative data module 16 is described in more detail with respect to FIG. 5. The functions of each module 12, 14, 16, and 18 could be combined into a lesser number of modules or more modules could be used without departing from the scope of the invention. Where multiple clients and/or providers are involved, multiple copies of each module could be used or a single copy could be used.

Data reporter 18 such as a reporting engine receives evaluated provider data from provider data module 12, evaluated client data from client data module 14, and evaluated quantitative data from quantitative data module 16. Data reporter 18 organizes the data to be reported to the provider and/or the client. The evaluated performance data may be reported using provider computer system 20 and/or client computer system 24.

Existing techniques for providing information about a relationship may include software that displays information about the relationship. This type of software includes the STRATEGIC ENTERPRISE MANAGEMENT software by SAP AG, CORMANAGE and CORBUSINESS software by CORVU CORPORATION, COGNOS BUSINESS INTELLIGENCE PLATFORM by COGNOS INCORPORATED, and the CUSTOMER RESPONSIVENESS MONITOR by INFORAY, INC. This type of software, however, typically displays only quantitative measures of the relationship, not qualitative feedback from the client or the provider.

Other existing techniques for providing information about a relationship may include processes for gathering feedback from the client. These techniques include conducting personal or electronic interviews or surveys of the client to gather client feedback, and reporting the client feedback to the provider. Companies such as TENACITY, INC. provide such client retention services. Software such as INQUISITE by CATAPULT SYSTEMS, CORP. and SATMETRIX by SATMETRIX SYSTEMS may be used to electronically survey clients to gather the client feedback. These techniques, however, generally do not provide quantitative information about the relationship or performance of the provider. Consequently, existing techniques for providing communication between a client and provider may be unsatisfactory for many needs.

FIG. 2 is a flowchart illustrating one example of a method for processing performance data. According to the method, performance data describing a relationship between a provider and a client is gathered. Performance data may comprise data from one or more sources, for example, client data, provider data, or quantitative data. The gathered performance data may be evaluated and reported. The performance data may be reported to the provider at a provider site and/or the client at a client site. A provider site may comprise a computer that a provider may use to access system 10, and client site may comprise a computer that a client may use to access system 10.

Referring to FIG. 2, steps 40 through 48 describe processing quantitative data. Steps 52 and 54 describe processing client data, and steps 56 and 58 describe processing provider data.

The method begins at step 40, where metrics are defined. A metric may measure features of a service to provide quantitative data. A metric may describe, for example, deliverables delivered on time or orders and payments processed. For example, a metric may be used to determine that 95% of deliverables are delivered on time or that 95% of orders received are processed. Certain metrics may be standardized across a number of different industries. Other metrics may be specific to an industry or specific to a particular client or group of clients.

A set of metrics may be used to define a service or product for a specific client. For example, a service may be defined in part using a metric that describes on-time deliverables and a metric that describes computer uptime. The metric for on-time deliverables may have a threshold value of 95%, and the metric for computer uptime may have a threshold value of 99%. A service that fails to meet the threshold values may be deemed as unsatisfactory. Different clients may have different threshold values for the same metric. A service may be marketed using the metrics that define the service.

A metric may have a minimum threshold value and a target threshold value. A provider may try to provide a service that meets the target threshold value. If the service does not meet the target threshold value, system 10 may provide a warning to the provider. If the service fails to meet the minimum threshold value, the service may be deemed unsatisfactory.

Quantitative data is gathered at step 42 according to the metrics. Quantitative data includes measurements of the service taken according to the metrics. For example, the number of deliverables delivered on time may be measured. Quantitative data may be gathered in any suitable manner such as, for example, retrieving data from quantitative data database 30, receiving input from clients or providers, or receiving data from other databases or systems. The quantitative data is stored at step 43.

The quantitative data is transformed by quantitative data module 16 at step 44. This step may be omitted for data that does not get transformed. Transforming the quantitative data may involve, for example, validating and mapping the quantitative data. validating the quantitative data may involve checking whether the data is received from an authorized source, whether the data is complete, and whether the data includes valid values. Mapping may include checking to see whether the data values are mapped to appropriate fields.

The quantitative data is aggregated at step 46. This step may be omitted for data that does not get aggregated. Data aggregation may involve summarizing values associated with multiple parts of an entity in order to obtain a value describing the entity as a whole. For example, data values describing sales at a number of locations of a client may be summarized to obtain a data value describing the sales for the client as a whole.

At step 48, performance ratings are determined from the quantitative data using a performance routine. This step may be omitted for data that is not associated with a performance rating. A metric may have one or more corresponding threshold values associated with it. Quantitative data gathered at step 42 may be compared (either in raw form, transformed form, or aggregated form) with the threshold values in order to determine a performance rating. After determining the performance ratings, the quantitative data including the performance ratings may be stored at step 50.

Client data is gathered from the client at step 52. The client data describes the service from the client's perspective. Client data may be gathered in any suitable manner. For example, the client may be interviewed in person. Alternatively or additionally, the client may complete a survey presented in any suitable manner. For example, the survey may be presented using a website with a query web page displaying a number of performance queries. The survey may also be presented in an electronic mail message or on paper. A process for gathering client data or provider data is described with reference to FIGS. 3A and 3B. The client data is stored at step 53. Client data module 14 determines performance ratings from the client data at step 26. A method for determining performance ratings is described with respect to FIG. 4. The method then proceeds to step 50 to store the client data including the performance ratings. As was the case above, this step may be omitted if no performance rating is associated with particular data.

Provider data is gathered from the provider at step 56. Provider data describes the service from the provider's perspective. The provider data may be gathered in any suitable manner, for example, using the techniques described with respect to step 52. Alternatively, a provider may directly enter provider data. The provider data is stored at step 57. Provider data module 12 determines performance ratings from the provider data at step 58. A method for determining performance ratings is described with respect to FIG. 4. The method proceeds to step 50 to store the provider data, including the performance ratings. As was the case above, this step may be omitted if no performance rating is associated with particular data.

The performance data is organized at step 60. For example, certain data may be selected to be reported to the provider, and other data may be selected to be reported to the client. The performance data is reported to the provider at the provider site at step 62. Examples of displayed data are described with reference to FIGS. 9 and 10. The reported performance data may include client data, provider data, and quantitative data. Performance data is reported to the client at the client site at step 64. The reported performance data may also include client data, provider data, and quantitative data. The performance data reported at the client site may be different from or similar to the performance data reported at the provider site.

In each case the reported data may be all or a subset of the stored data. Access to some or all of the stored data may be restricted with respect to the client, the provider, or certain personnel thereof.

At step 65, if the ratings are satisfactory, the method terminates. If the ratings are not satisfactory, the method proceeds to step 66. At step 66, the provider and the client may respond to the reported performance data. For example, if the performance data indicates a problem with the service, the provider may initiate a critical response procedure, which may involve obtaining feedback from the client. The method then returns to steps 40, 52, and 56.

FIG. 3A is a flowchart illustrating an example of a process for gathering data from a client using a survey generator of client data module 14. The process may also be used to gather data from a provider using provider data module 12. The process begins at step 420, where a survey profile is generated, and profile information from the survey profile is stored in a survey profile database. The survey profile may be generated by a user conducting the survey, for example, representative of the provider. Profile information may include the types of questions, or performance queries, selected for the survey and the language in which the questions are to be presented.

The illustrated example process may initiate other processes. For example, if the questions are not to be presented using a website at step 421, a process for conducting non-website surveys may be initiated at step 423. An example of such a process is described with reference to FIG. 3B. Other processes, however, may be initiated or the process for gathering data may be terminated without departing from the scope of the invention. If the questions are to be presented using a website, the process proceeds to step 422. Alternatively or additionally, for example, if the questions are not to be presented in English at step 422, a process for conducting non-English surveys may be initiated at step 423. Other processes, however, may be initiated or the process for gathering data may be terminated without departing from the scope of the invention. If the questions are to be presented in English at step 422, the process proceeds to step 424.

Client data module 14 notifies a client contact of the survey at step 424. The client contact may comprise a representative of the client who is designated as a contact person for the provider. The client contact may be notified by an electronic mail message that includes a link back to client data module 14. At step 426, the client contact designates the participants to be surveyed and provides approval to survey the participants. The client contact may submit information about the participants and the approval using the link to client data module 14. Participant information such as the participants' names and electronic mail addresses is written into a survey profile database.

A survey link that allows participants to access the survey is sent to the participants at step 428. The survey link may comprise a uniform resource identifier (URI) address pointing to the survey. Client data module 14 reads the participants' electronic mail addresses from the survey profile database and sends the participants an electronic mail message that includes the survey link. The survey process is initiated at step 430. The survey process may use electronic survey software such as INQUISITE by CATAPULT SYSTEMS, CORP.

The survey responses, or query responses, are written into a survey results database. The survey results database is monitored for new survey results at step 432. If there are no new survey results at step 434, client data module 14 returns to step 432 to continue to monitor the survey results. If there are new survey results at step 434, the process proceeds to step 436, where client data module 14 determines whether the survey results are from the first respondent of the survey. If the survey results are from the first respondent, the process proceeds to step 438 to change a link on a display describing the last survey taken by the client. Examples of displays that include such links are described with respect to FIGS. 9 and 10. The link points to the new survey information, and may allow a user of system 10 to access the information. The link is activated at step 440 and the process proceeds to step 442. If the results are not from a first respondent at step 436, the process proceeds directly to step 442.

In the illustrated example, the survey results are processed at step 442. The survey results are extracted, transformed, and loaded into a rated survey database of data reporter 18. Extracting, transforming, and loading data are described in more detail with reference to FIGS. 5 through 8. Other methods of processing the survey results, however, may be used without departing from the scope of the invention. Old survey results are moved from the rated survey database of data reporter 18 and to a historical survey database at step 444. After moving the old survey results, the process terminates.

FIG. 3B is a flowchart illustrating one example of a process for conducting surveys such as non-website or non-English surveys using client data module 14. The method may also be used with provider data module 12. The illustrated example process for conducting surveys may be used with the process for gathering data described with reference to FIG. 3A. The process for gathering data, however, may use other suitable processes for conducting surveys without departing from the scope of the invention.

The process begins at step 460, where client data module 14 receives a survey request. The survey request may be sent to client data module 14 from a provider representative responsible for a client. In response, client data module 14 may display a survey status as "request pending" and a participant status as "pending activation."

The survey is activated at step 462. The provider representative may review and approve a list of survey participants prior to activating a survey. The provider representative may send a request to client data module 14 to activate the survey. In response, the client data module 14 may update the survey status to "active" and the participant status to "awaiting response". At step 464, the surveys are distributed. Client data module 14 may provide the surveys in any of a number of languages. Any suitable method for distributing the surveys in a selected language may be used, for example, electronic versions of the surveys may be provided to the participants via electronic mail or via a website. Alternatively or additionally, paper copies of the survey may be printed and sent to the participants.

The responses are received and recorded at step 466. The responses may be received in any suitable manner, for example, the responses may be received by paper or by electronic mail message. The responses may be recorded in client data module 14 in any suitable manner. For example, the responses may be recorded by hand or may be scanned using a scanning device.

The illustrated example may provide for translating surveys. This feature, however, may be omitted without departing from the scope of the invention. In the illustrated example, if a translation is needed at step 468, the process proceeds to step 470 to translate the responses. The surveys may be translated from one language to another language such as English or other suitable language. The responses may be translated by any suitable manner, for example, by using a human translator or by using translating software. If the surveys do not need to be translated at step 468, the process proceeds directly to step 472, where the responses are reported. The responses may be reported to the client and the provider. After reporting the responses, the process terminates.

FIG. 4 is a flowchart illustrating one example of a method for evaluating client data, provider data, or quantitative data. According to the method, questions regarding the performance of the provider are presented to a client or a provider. Responses to the questions are evaluated and assigned ratings, which are reported to the provider and/or the client. In the illustrated example, client data is evaluated.

The method begins at step 80, where questions regarding the performance of the provider are presented. The questions may include, for example, the following to which a response of poor, fair, average, good, excellent, or not applicable is requested:

1. Overall, you would rate the provider's performance as:
2. The reference you would provide about the provider today is:
3. The likelihood that you would renew your business with the provider is:
4. Overall, you would rate the value the provider provides to your business as:

Other questions of a similar type may be included or other questions of a different type may be included without departing from the scope of the invention. Also, these questions are only examples and some or all of them could be omitted.

The questions may be presented in any suitable format. For example, the questions may be presented using a paper survey or an electronic survey included in an electronic mail message or on a website. Alternatively, the client may be interviewed in person to obtain responses. The responses to the questions are received by client data module 14 at step 82. The responses may be automatically received from an electronic survey or may be input using provider computer system 20 or client computer system 24.

A list of questions to be evaluated and reported is generated at step 83. All or a subset of the questions may be evaluated and reported. For example, Questions 1 and 2 may be selected. A next question from the list is selected at step 84.

Steps 86 through 102 describe an example technique for evaluating responses to a question to determine a rating for an attribute of the service described by the question. Other techniques for evaluating responses, however, may be used without departing from the scope of the invention. At step 85, client data module 14 determines whether the responses are "not applicable." If the responses are "not applicable", the responses are given a "not applicable" rating, and the method proceeds to step 104. Otherwise the method proceeds to step 87. At step 87, the ratio of the number of excellent responses to the question divided by the total number of responses to the question is calculated. If the ratio is greater than or equal to a predetermined target percentage, for example, 51 percent, the method proceeds to step 88, where the responses to the question are rated as excellent. The method then proceeds to step 104, where client data module 14 determines whether there is a next question on the list. If the ratio is less than the target percentage, the method proceeds to step 90.

At step 90, if the ratio is the number of good plus excellent responses divided by the total number of responses is greater than or equal to the target percentage, the method proceeds to step 92, where the responses to the question are rated as good. The method then proceeds to step 104. If the ratio is less than the target percentage, the method proceeds to step 94. At step 94, if the ratio of the number of average plus good plus excellent responses divided by the total number of responses is greater than or equal to the target percentage, the method proceeds to step 96, where the responses to the question are rated as average. The method then proceeds to step 104. If the ratio is less than the target percentage, the method proceeds to step 98.

At step 98, if the number of fair plus average plus good plus excellent responses divided by the total number of responses is greater than or equal to the target percentage, the method proceeds to step 98, where the responses to the question are rated as fair. The method then proceeds to step 104. If the ratio is less than the target percentage, the method proceeds to step 102, where the responses to the question are rated as poor. The method then proceeds to step 104. While one example way to evaluate responses has been described, others could be used without departing from the scope of the invention. For example, the total percentage or absolute number of a type of response could simply be computed.

Client data module 14 determines whether there is a next question of the list at step 104. If there is a next question, the method returns to step 84 to select the next question. If there is no next question, the method proceeds to step 106, where data reporter 18 reports the ratings of the responses of the questions. Data reporter may assign a status indicator to represent a specific rating. For example, an excellent rating may be represented by a blue diamond, a good rating may be represented by a green circle, an average rating may be represented by a yellow triangle with a plus sign, a fair rating may be represented by a yellow triangle with a minus sign, and a poor rating may be represented by a red square. After reporting the ratings, the method terminates.

Figure 5:
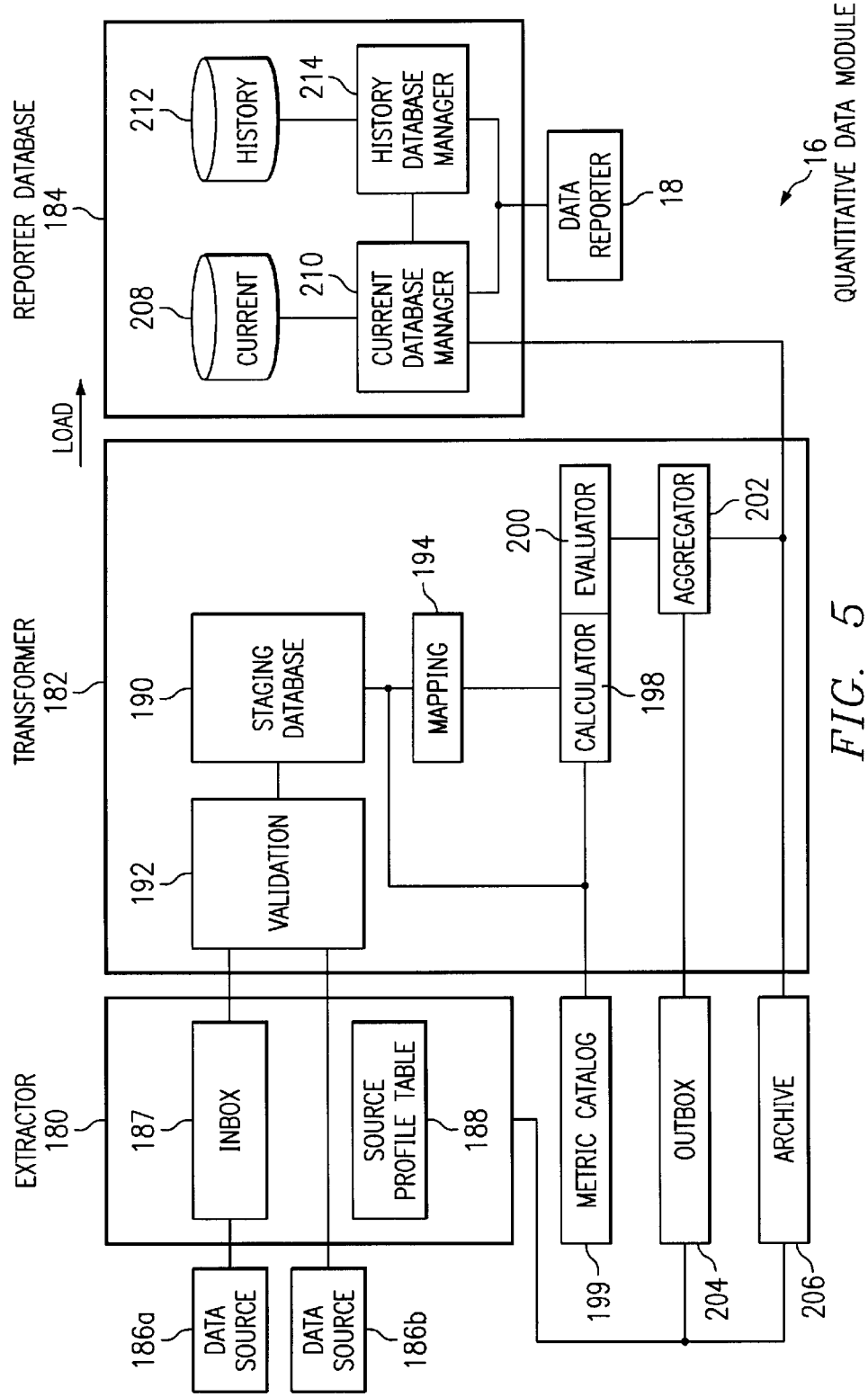
FIG. 5 is a block diagram of one example of a quantitative data module.

FIG. 5 is a block diagram of one example of a quantitative data module 16. Quantitative data module 16 includes an extractor 180, a transformer 182, and a reporter database 184. Extractor 180 obtains data from a data source 186 such as quantitative data database 30. A source profile table 188 identifies data sources 186 that supply data to extractor 180. Source profile table 188 may describe contact information associated with data source 186, a method for retrieving data from data source 186, the location of data source 186, and identifiers and passwords that data source 186 needs to access actual data module 16 or vice versa. Data may be pulled from a data source 186*b* that is structured to support data pulls and may be transmitted directly to transformer 182. Alternatively, data may be pushed from a data source 186*a* that does not support data pulls into an inbox 187, which structures and transmits the data to transformer 182.

Transformer 182 validates, evaluates, and aggregates performance data received from extractor 180. As discussed above, not all of these operations are necessarily performed on all performance data. A validation module 192 checks the validity of the received data. Validating the performance data may involve checking whether the data for a metric is received from an authorized source, whether the data is complete, and whether the data includes valid values. Validation module 192 may return invalid data for correction and resubmission. Validation module 192 may access a metric catalog 199 in order to determine how to validate a metric.

Metric catalog 199 may include, for example, a definition of each metric, a procedure for collecting data for each metric, a validation procedure for the collected data, a formula for calculating a metric value from collected data, and threshold values that may be used to determine a rating from the calculated metric value. A client may be associated with specific client threshold values, which may reflect a level of service selected by the client. Default threshold values such as market values may be used in the absence of client threshold values. Market values may reflect a standard level of service in an industry. Metric catalog 199 may also include reporting periods for collecting data for a metric and a lifetime for collected data. Metric catalog 199 may also describe whether a metric may be viewed by a particular client.

TABLES 1 through 5 illustrate examples of information that may be included in metric catalog 199. Metric catalog 199 may include different or additional information without departing from the scope of the invention.

TABLE 1 describes a metric and any associated service.

TABLE 1

| | |
|---|---|
| Line(s) of Business | Line of Business(s) to which the metric is associated. |
| Service Offering(s) | Service Offering(s) to which the metric is associated. |
| Metric Name | Name of the metric. |
| Description | Description of the metric measurement. |
| Unit of Measure | Description of the unit of measure for the metric. |
| Client Viewable | Indicates whether the metric is viewable by the client. |

TABLE 2 includes information for evaluating and reporting metric data.

TABLE 2

| | |
|---|---|
| Default Target Threshold | The threshold value that represents the target level of service. A rating of a metric that meets a target threshold value is displayed using a green indicator. |
| Comparison Method | Describes a comparison method, for example, <, <=, =, >, or >=. |
| Default Minimum | The threshold value that represents the minimum acceptable level of service. A rating of a metric that |

TABLE 2-continued

| | |
|---|---|
| Threshold | meets a minimum threshold value, but not a target threshold value, is displayed using a yellow indicator. Otherwise, the rating is displayed using a red indicator. |
| Level of Service Name | Name of the Level of Service. |
| Level of Service Description | Description of the Level of Service. |
| Level of Service Target Threshold | The threshold value that represents the target level of service for a specific level of service. A rating of a metric that meets a target threshold value is displayed using a green indicator. |
| Level of Service Minimum Threshold | A threshold value that represents the minimum acceptable level of service for a specific level of service. A rating of a metric that meets a minimum threshold value, but not a target threshold value, is displayed using a yellow indicator. Otherwise, the rating is displayed using a red indicator. |

TABLE 3 includes information for collecting metric data.

TABLE 3

| | |
|---|---|
| Process Requirements | Technical information that may be used for data collection, for example, tools, techniques, measurement points, or assumptions. |
| Inclusion/ Exclusion Criteria | Adjustments to raw data across clients to ensure a common result. |
| Time Granularity (Frequency) | The minimum frequency at which data is collected and retained at a collection point to support reporting links. |
| Location Granularity | The minimum granularity of locations at which data is collected and retained at a collection point to support reporting links. |
| Client Granularity | The minimum granularity of client definition at which data is collected and retained at a collection point to support reporting links. |
| Point of Delivery | The lowest level of granularity for the metric in the definition of delivery location. |

TABLE 4 includes information for reporting metric data.

TABLE 4

| | |
|---|---|
| Time Granularity (Frequency) | The frequency at which data is aggregated at a collection point to support reporting links. |
| Location Granularity | The granularity of location at which data is aggregated at a collection point to support reporting links. |
| Client Granularity | The granularity of client definition at which data is aggregated at a collection point to support reporting links. |

Table 5 includes information for aggregating metric data.

TABLE 5

| | |
|---|---|
| Variable Name | Name of the variable. |
| Aggregation Calculation | The calculation for deriving the metric values from the aggregated values defined below. |
| Data Type | Data type, for example, numeric or character. |
| Aggregation Method | The rule for combining data from multiple points of delivery. The rule defines how variables are accumulated prior to re-executing the calculation at each level of summarization. |
| Validation Method | Describes the validation method. |
| Validation Values | Values used to validate a variable. |
| Description | Description of the variable. |

A staging database 190 receives and stores data from validation module 192. A mapping module 194 may map received data values to the appropriate fields. A calculator 198 calculates a metric value from the received data. Calculator 198 may retrieve a formula for calculating the metric value from a metric catalog 199 that includes information describing the defined metrics.

An evaluator 200 may be used to determine a rating from a metric value according to a threshold value. For example, evaluator 200 may determine that a rating is "good" if the metric value is greater than or equal to a threshold value, or that a rating is "bad" is the metric value is less than the threshold value. A metric may have multiple threshold values that define multiple ratings. Threshold values may include client's specific threshold values that are used to calculate ratings for a specific client. Market thresholds may be used to determine a rating if a client specified threshold is not available.

Aggregator 202 combines and summarizes data. Aggregator 202 may aggregate validated, mapped data received from mapping module 194 and send the aggregated data to calculator 198 and evaluator 200 for evaluation. Data may be aggregated at any level. For example, data collected for a metric at a regional level may be aggregated in order to determine a rating for the metric at the regional level. Aggregator 202 may aggregate data to be sent to an outbox 204 or to be stored in an archive 206. Outbox 204 may send data to another site, and archive 206 may maintain backup copies of files. Aggregated data may also be sent to reporter database 184 to be reported to a client and/or provider. Instructions for aggregating data may be stored in metric catalog 199.

Reporter database 184 may include a current database 208 managed by a current database manager 210 and a history database 212 managed by a history database manager 214. Current database manager 210 receives aggregated data from aggregator 202 and stores the received data in current database 208. Current database manager 210 may copy existing data to history database manager 214 and then overwrite the existing data with newly received data in order to optimize space in current database 208. Data reporter 18 may receive data from current database manager 210 and history database manager 214.

The modules of quantitative data module 16 may have an alternative configuration without departing from the scope of the invention. Other modules may be included, and some modules may be omitted. The functions of quantitative data module 16 may be performed in an alternative manner.

Figure 6:
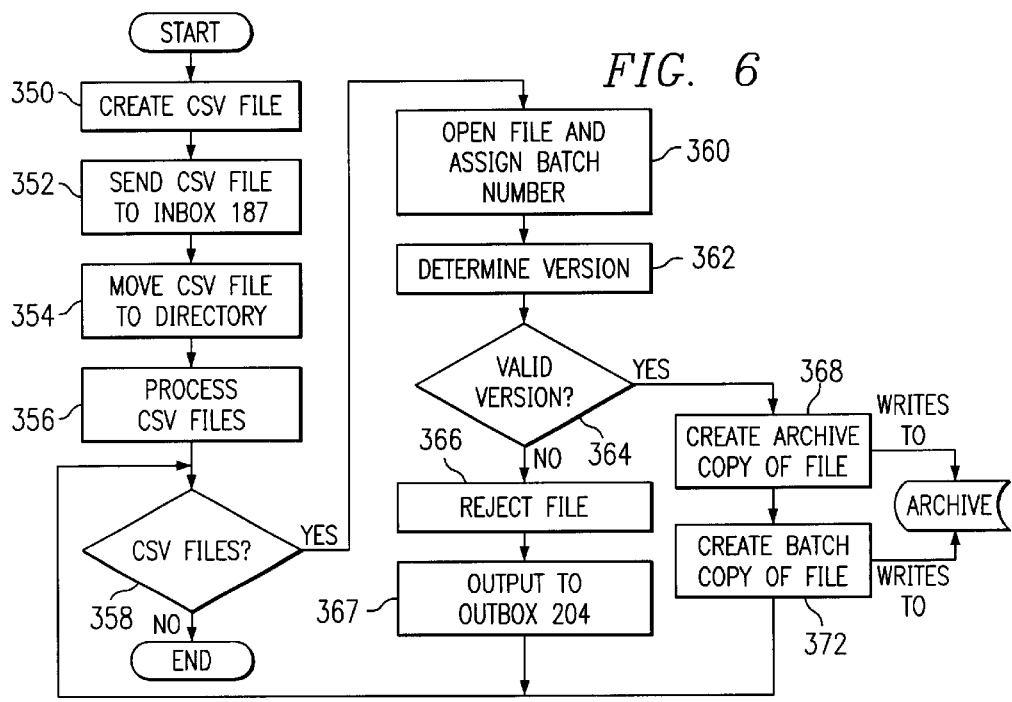
FIG. 6 is a flowchart illustrating one example of a process for extracting data.

FIG. 6 is a flowchart illustrating an example of a process for extracting data that may be used by extractor 180. The process begins at step 350, where a comma separated values (CSV) file is created at an originating site associated with the client. The CSV file includes quantitative data collected according to metrics, and may be created according to published guidelines. The CSV file is sent to inbox 187 at step 352. Inbox 187 may comprise an inbox that receives electronic mail messages. At step 354, the CSV file is moved to a directory associated with the originating site. The CSV file may be moved automatically or by users monitoring inbox 187 for incoming CSV files. Input CSV files are processed at step 356.

The process may check the directories for CSV files at step 358. If there are no CSV files, the process terminates. If there are CSV files, the process proceeds to step 360. At step 360, the file is opened and a batch number is assigned to the file. The version of the input format of the file is determined at step 362. The version of the file is validated at step 364. If the version is not valid, the process proceeds to step 366 to reject the file. The rejected file is copied to an archive and sent to outbox 204 at step 367, which transmits the file to the originating site, and the process returns to step 358. A version that is merely outdated but not invalid may be updated to a current input format.

If the version is valid at step 364, the process proceeds to step 368. At step 368, an archive copy of the file is created as a backup copy, and saved in archive 206. At step 372, a batch copy of the file is created to be used in the validation process. The batch copy of the file is saved to archive 206, and the process returns to step 358.

Figure 7:
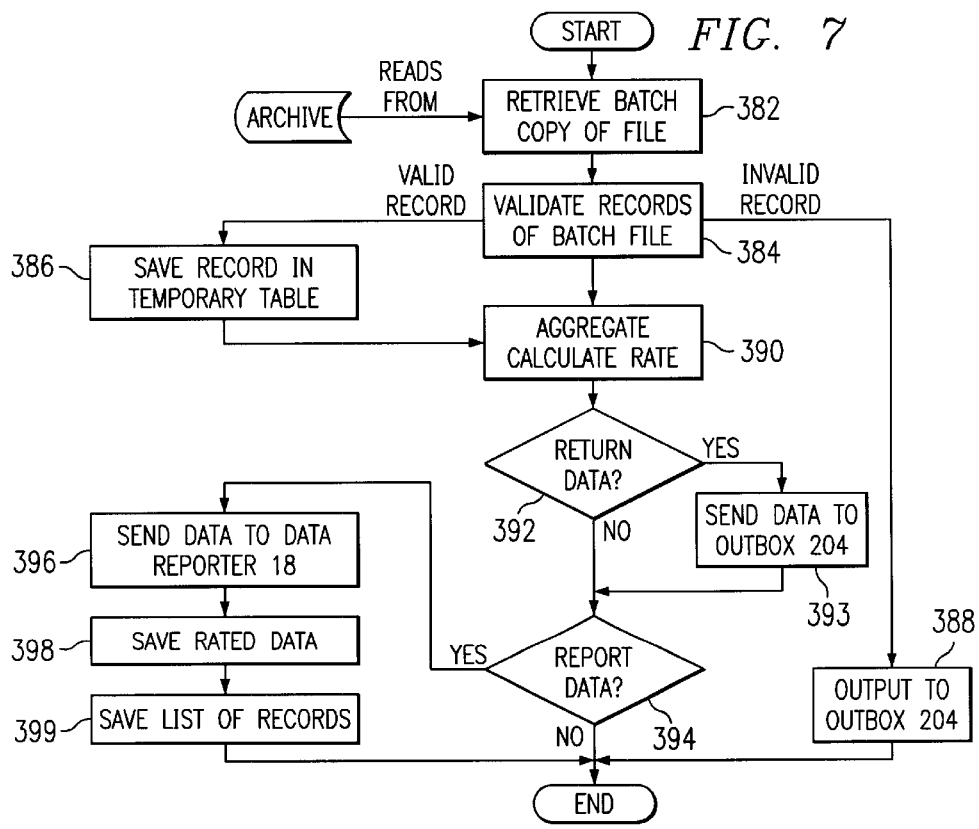
FIG. 7 is a flowchart illustrating one example of a process for transforming data.

FIG. 7 is a flowchart illustrating an example of a process for transforming data that may be used by transformer 182. The process begins at step 382, where transformer 182 retrieves a batch copy of a file from archive 206. The records of the batch copy of the file are validated by validation module 192 at step 384. According to one example, validation module 192 may perform the following validation procedure. An output indicator may be checked to determine whether the data is to be aggregated, rated and returned to the originating site, or aggregated, rated, and reported to data reporter 18. If the output indicator has an invalid value, the record may be rejected. A site code may be checked to determine that the originating site is a valid site, and a site-metric authorization may be checked to determine if the site is authorized to send data for the metric.

A client field and client identifier may be checked to determine whether the client is valid. A location field may be checked to determine whether the geographical area associated with the record is valid. Reporting period information such as starting and ending dates may be checked to see if the reporting period is valid. Metric information may be checked to ensure that the metric is valid. A metric element aggregation method field may be read to determine a procedure for aggregating data associated with the metric.

Records that are valid are saved in a temporary table of staging database 190 at step 386. Records that are not valid are sent to outbox 204 for transmittal to the originating site at step 388. The invalid records may include a message identifying the problem with the record, so that the originating site may correct the record.

At step 390, the data is aggregated, calculated, and rated. The data is aggregated according to the metric element aggregation method associated with the record. A metric value is calculated from the aggregated data. The metric value is compared to a threshold value associated with the metric in order to determine a rating. At step 392, transformer 182 determines whether the rated data is to be reported to the originating site. If the data is to be reported, the process proceeds to step 393, where the rated data is sent to outbox 204 for transfer to the originating site, and the process proceeds to step 394.

If the file is not to be reported, the process proceeds directly to step 394. At step 394, transformer 182 determines whether the data is to be reported to data reporter 18. If the data is not to be reported, the process returns to step 382. If the data is to be reported, the process proceeds to step 396, where the data is sent to data reporter 18. The rated data is saved in rated table of staging database 190 at step 398, and a list of the processed records is saved in a control table of staging database 190 at step 399. After saving the list of records, the process terminates.

Figure 8:
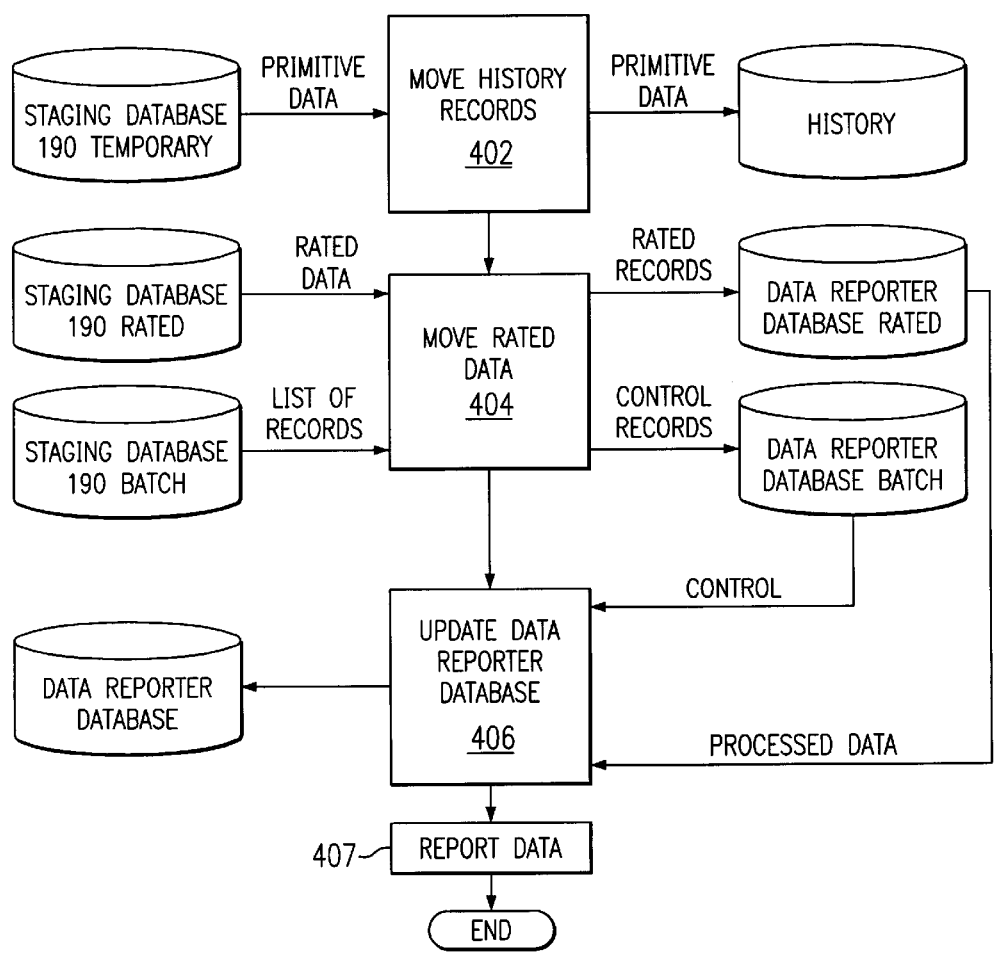
FIG. 8 is a flowchart illustrating one example of a process for loading data.

FIG. 8 is a flowchart illustrating an example of a process for loading data that may be used by reporter database 184. The process begins at step 402, where history records are moved from a temporary table of staging database 190 to history database 212. History records may include validated records, and may be restricted to include validated records but not invalid records. Data is moved from staging database 190 to a data reporter database at step 404. Rated data may be moved from a rated table of staging database 190 to a rated table of data reporter database. A list of processed records may be moved from a batch table of staged database 190 to a batch table of data reporter database.

At step 406, a data reporter database is updated. A list of processed records is retrieved from the batch table, and rated data is retrieved from the rated table. Data associated with a line of business may be stored in a metric table of the data reporter database prior to display. Data associated with a region and identified by a URI address may be stored in a table of the data reporter database prior to display. At step 407, the data is reported. Data may be reported to a user using a display. Examples of displays are described with reference to FIGS. 9 and 10.

According to one example, when a user requests data by, for example, activating a link, an active server page (ASP) is executed. The ASP calls on software components such as Microsoft Component Object Model components, which in turn call on stored procedures in the data reporter database. The stored procedures retrieve the requested data. The ASP formats the data into, for example, hypertext markup language (HTML) for display. After reporting the data, the process terminates.

Figure 9:
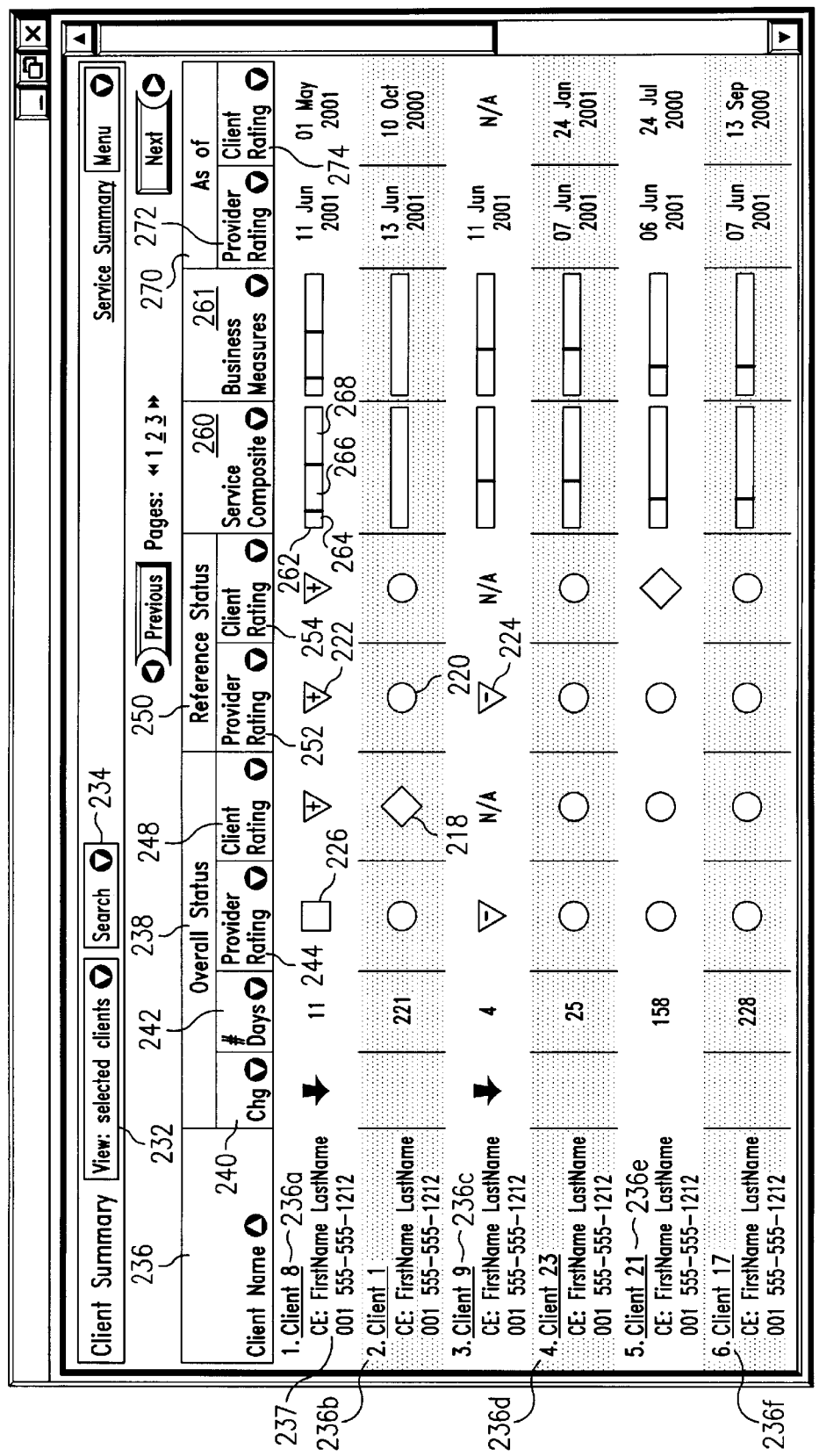
FIGS. 9, 10, and 11 illustrate examples of displays for reporting performance data.

FIG. 9 illustrates an example of a display 230 for reporting performance data. Display 230 may report any combination of client data, provider data, and/or quantitative data for a number of clients. A view button 232 may be used to customize the view to selected clients, and a search button 234 may be used to search for specific clients.

Clients may be searched by filtering for attributes of the clients. Attributes may include, for example, status, line of business, region, industry, and tier attributes. The filters may be set to search for zero or more values for the attributes. The status attribute describes the status of a client, and may have status values such as active and inactive values.

The line of business attribute may describe the lines of business provided by the provider. The line of business values may include, for example, electronic solutions, information solutions, or business process management solutions. The region attribute may describe a geographic region, and may be defined as a sub-attribute of the lines of business to accommodate situations where different lines of business have different regions. For example, one line of business may divide the United States into three regions, such as the east, west, and midwest regions, but another line of business may divide the United States into five regions, such as the northeast, southeast, midwest, west, and southwest regions. A user may be given the option to select a line of business in all regions encompassed by the line of business or to select a specific region of the line of business.

The industry attribute may describe the industry to which a client belongs. Industry values may include, for example, manufacturing, financial, and government. The tier attribute may describe, for example, the size of a client. Tier values may include, for example, enterprise, strategic, key, and general values. A tier value such as a multiple client group value may be used to describe a number of smaller clients reported as one client. The filter settings may be stored as part of a user's profile, so that they persist from one user session to the next user session.

Clients are listed by client name 236. Selecting a specific client name 236 displays a detailed view of the client, which is described in more detail with respect to FIG. 10. Contact information 237 of a provider employee responsible for a client may be displayed along with the client name 236.

An overall status section 238 describes the overall performance of the provider from the perspectives of the client and of the provider. This information may be gathered using, for example, the responses to Question 1 of the survey described with reference to FIG. 4. A change column 240 describes a change in the overall status with respect to the previous assessment. A number of days column 242 indicates the number of days since the previous assessment. This section could be omitted or formatted differently without departing from the scope of the invention.

A provider ratings column 244 indicates a rating of the overall status calculated using provider data. A client ratings column 248 indicates a rating of the overall performance of the provider calculated using client data. The ratings and the corresponding status indicators may be determined in a manner substantially similar to the technique described with respect to FIG. 4. A blue diamond 218 may represent an excellent rating, a green circle 220 may represent a good rating, a yellow triangle with a plus sign 222 may represent an average rating, a yellow triangle with a minus sign 224 may represent a fair rating, and a red square 226 may represent a poor rating. Other symbols or rating types could of course be used without departing from the scope of the invention. These columns could also be omitted.

A reference status section 250 describes the referenceability of the provider. Referenceability may be determined using Question 2 of the survey described with reference to FIG. 4. A provider ratings column 252 indicates a rating of referenceability calculated using provider data, and a client ratings column 254 indicates a rating of referenceability calculated using client data. This section could be omitted or formatted differently without departing from the scope of the invention.

A service composite section 260 reports quantitative data describing services provided by the provider. A service may be associated with a set of metrics that may be used to collect quantitative data in order to evaluate the service. A composite bar 262 may be used to indicate the proportion of services that have specific ratings. A red portion 264 of composite bar 262 may represent the proportion of service offerings that have a poor rating, a yellow portion 266 may represent the proportion of service offerings that have an average rating, and a green portion 268 may represent the proportion of service offerings that have a good rating. For example, composite bar 262a may indicate that one of fourteen services is red, six services are yellow, and seven services are green. Placing a cursor over composite bar 262 may display the total number of services, the number of services that are rated at a particular color, and the percentage of services that are rated at a particular color. This section could be omitted or formatted differently without departing from the scope of the invention.

A business measures section 261 reports quantitative data that a provider may use to monitor a client. Metrics that may be used include, for example, profitability metrics such as an accounts receivable metric. A composite bar may be used to indicate the proportion of metrics that have specific ratings.

An "as of" section 270 displays the dates of the latest client data or provider data input. Providers ratings columns 272 displays the date of the last provider data input, and a client ratings column 274 displays the date of the last client data input. This section could be omitted or formatted differently without departing from the scope of the invention.

The sections of display 230 may have a different arrangement. Other sections may be included, and some sections may be omitted or formatted differently. Information may be displayed using any suitable arrangement.

Figure 10:
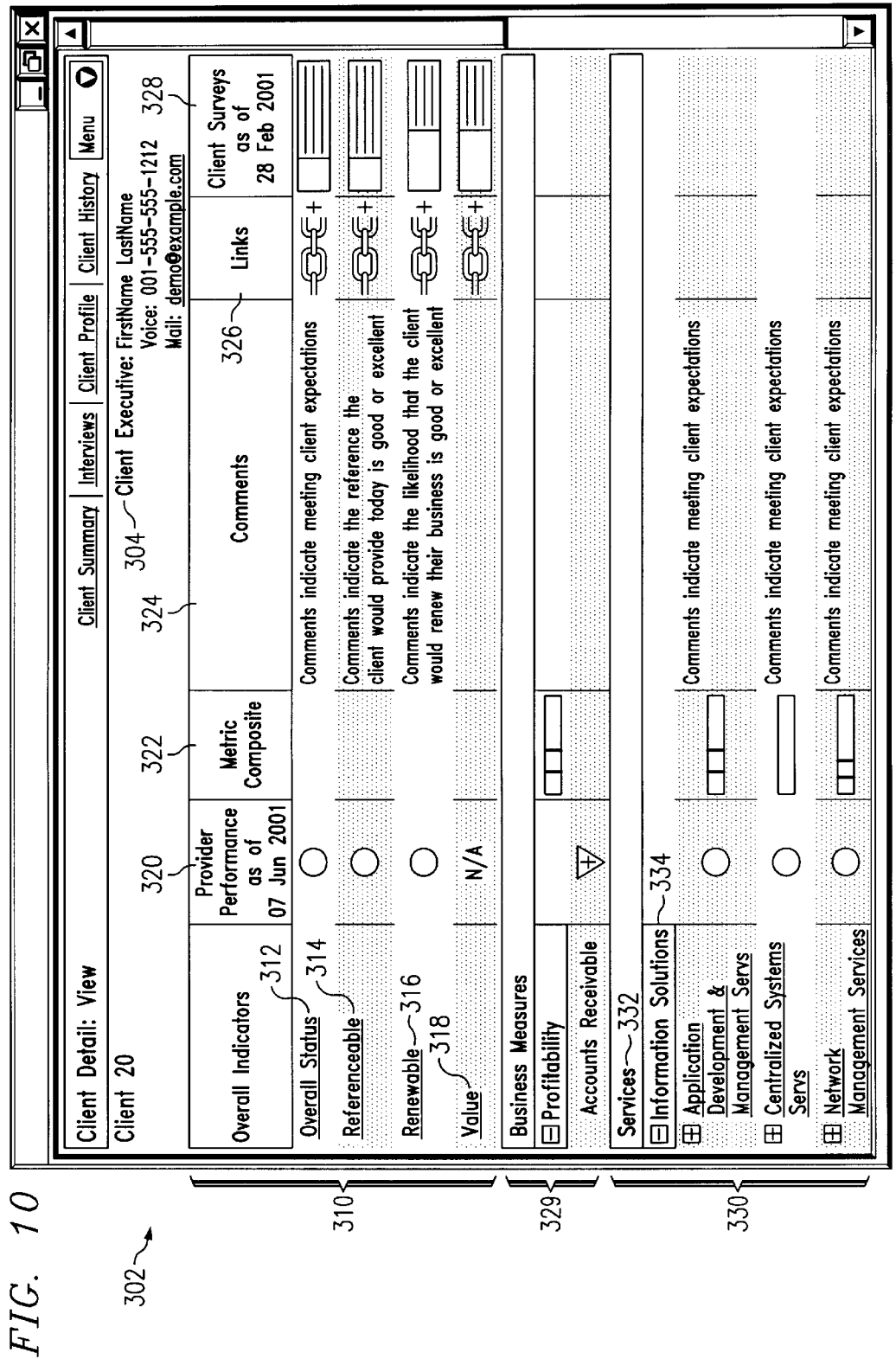

FIG. 10 illustrates one example of a display 302 reporting details of a specific client. Display 302 reports client data, provider data, and/or quantitative data for a client. Display 302 may include contact information 304 for a provider employee responsible for the client.

An overall indicator section 310 describes client data and provider data. Indicators may include an overall status indicator 312, a referenceability indicator 314, a renewability indicator 316, and a value indicator 318. Other indicators may be used without departing from the scope of the invention. Data for these indicators may be gathered using any suitable procedure, for example, using Questions 1 through 4, respectively, of the survey described with respect to FIG. 4. A provider performance column 320 displays a rating for each indicator. A metric composite column 322 describes quantitative data, and is described in more detail below. A comments section 324 displays comments that may be entered by the provider. Links 326 allow a user to access, for example, client survey responses. A client surveys column 328 displays the proportion of surveys that have specific ratings. This section may be omitted or formatted differently without departing from the scope of the invention.

A business measures section 329 reports quantitative data that a provider may use to monitor a client. Metrics for this section may include, for example, profitability metrics such as an accounts receivable metric. A services section 330 reports quantitative data describing services provided to the client. A service may be associated with a set of metrics used to collect quantitative data in order to evaluate the service. A services column 332 lists the services. Services may be listed according to a service type 334. In the illustrated example, services of the information solution service type include application development and management services, centralized systems services, and network management services.

Provider performance column 320 displays ratings of the metrics. Metric composite column 322 displays composite bars, where each composite bar describes the proportion of a metric that has a specific rating. Other ratings and indicators may be used without departing from the scope of the invention. Comments section 324 displays comments regarding the services that may be entered by the provider. This section may be omitted or formatted differently without departing from the scope of the invention.

The sections of display 302 may have a different arrangement. Other sections may be included, and some other sections may be omitted or formatted differently. Information may be displayed using any suitable arrangement.

Figure 11:
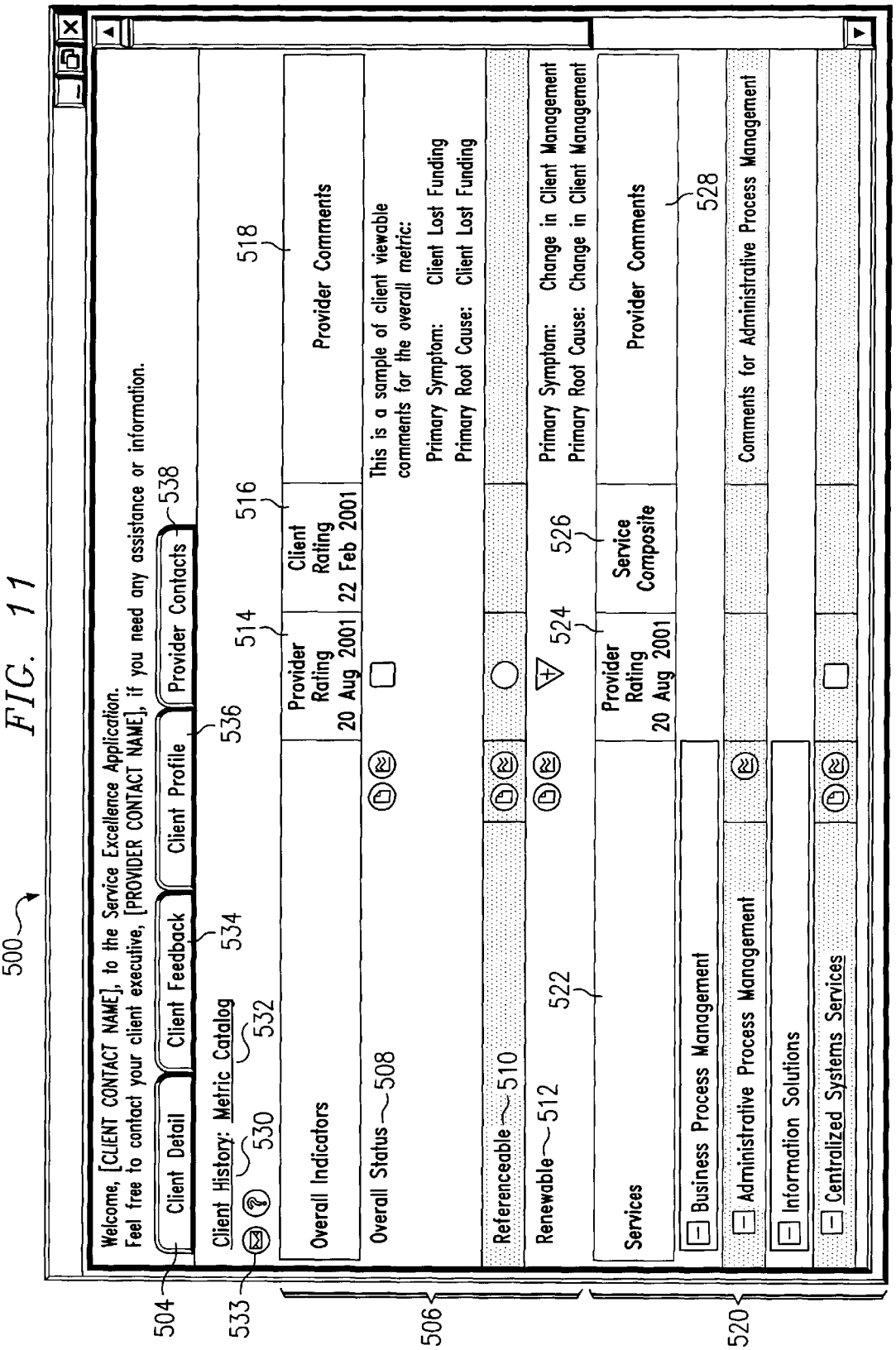

FIG. 11 illustrates one example of a display 500 that may be used to report performance data to a client. Display 500 includes a client detail section 504. An overall indicator section 506 describes client data and provider data. Indicators may include an overall status indicator 508, a referenceability indicator 510, and a renewability indicator 512. Other indicators may be used without departing from the scope of the invention. Data for these indicators may be gathered using any suitable procedure, for example, using questions 1 through 3, respectively, of the survey described with respect to FIG. 4. A provider rating column 514 displays a rating for each indicator generated from the provider data, and a client rating column 516 displays a rating for each indicator generated from the client data. A provider comments section 518 displays comments that may be entered by the provider.

A services section 520 reports qualitative and quantitative data describing the services provided to the client. A services column 522 lists the services. A provider rating column 524 displays ratings for the services generated from the provider data. A service composite column 526 displays ratings for the services generated from quantitative data. A provider comments section 528 displays comments entered by the provider.

A client history link 530 may be used to access ratings from previous rating periods. These ratings may be displayed in any suitable graphical form. A metric catalog link 532 may provide access to metric catalog 199. An email link 533 may be used to display a window that a client may use to submit an email message to the provider. The email message may include information about the performance data reported to the client at the time email link 533 was activate. A client feedback link 534 may be used to access client interviews and/or client surveys. A client profile link 536 may be used to display information about the client, for example, a list of the executive leaders, authorized users, and/or client contacts. A provider contacts link 538 may be used to display provider representatives whom the client may contact.

The sections of display 500 may have any suitable arrangement. Other sections may be included, and some sections may be omitted or formatted differently. Information may be displayed using any suitable arrangement.

Although an embodiment of the invention and its advantages are described in detail, a person skilled in the art could make various alterations, additions, and omissions without departing from the spirit and scope of the present invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

What is claimed is:

1. A method for processing performance data, comprising:
   receiving performance data comprising quantitative data gathered according to at least one metric;
   evaluating the quantitative data according to the at least one metric to generate at least one quantitative data rating;
   receiving performance data comprising client data gathered from a client;
   evaluating the client data to generate at least one client data rating;
   receiving performance data comprising provider data gathered from a provider;
   evaluating the provider data to generate at least one provider data rating; and
   reporting the at least one quantitative data rating, the at least one client data rating, and the at least one provider data rating.

2. The method of claim 1, wherein reporting the quantitative data rating and the client data rating comprises substantially simultaneously displaying the at least one quantitative data rating and the at least one client data rating.

3. The method of claim 1, wherein evaluating the quantitative data comprises:
   calculating a metric value from the quantitative data according to a formula associated with a metric;
   comparing the metric value to at least one threshold value associated with the metric; and
   determining a quantitative data rating in response to the comparison.

4. The method of claim 3, wherein the at least one threshold value comprises a minimum threshold value.

5. The method of claim 3, wherein the at least one threshold value comprises a maximum threshold value.

6. The method of claim 3, wherein the at least one threshold value comprises a target threshold value.

7. The method of claim 1, wherein evaluating the client data comprises:
   selecting the client data comprising a plurality of responses describing an attribute of the provider; and
   repeating the following until a ranking is made, starting from a highest rating and ending with a lowest rating:
      selecting a rating; and
      ranking the attribute according to the selected rating if at least a target percentage of the selected responses is associated with the selected rating or with a higher rating.

8. The method of claim 1, further comprising:
   determining a status indicator associated with the at least one client data rating, the status indicator being a member of a set of status indicators, each status indicator associated with a rating status and having a distinct color; and
   displaying the determined status indicator.

9. The method of claim 1, further comprising:
   determining a status indicator associated with the at least one client data rating, the status indicator being a member of a set of status indicators, each status indicator associated with a rating status and having a distinct shape; and
   displaying the determined status indicator.

10. The method of claim 1, further comprising:
    determining at least one proportion describing a metric associated with a quantitative data rating; and
    reporting the proportion using an indicator having a part proportional to a proportion.

11. A system for processing performance data, comprising:
    a quantitative data module operable to:
       receive performance data comprising quantitative data gathered according to at least one metric; and
       evaluate the quantitative data according to the at least one metric to generate at least one quantitative data rating;
    a client data module operable to:
       receive performance data comprising client data gathered from a client;
       evaluate the client data to generate at least one client data rating; and
    a provider data module operable to:
       receive performance data comprising provider data gathered from a provider;
       evaluate the provider data to generate at least one provider data rating; and
    a data reporter coupled to the quantitative data module, the client data module, and the provider data module and operable to report the at least one quantitative data rating, the at least one client data rating, and the at least one provider data rating.

12. The system of claim 11, wherein the data reporter is operable to report the quantitative data rating and the client data rating by substantially simultaneously displaying the at least one quantitative data rating and the at least one client data rating.

13. The system of claim 11, wherein the quantitative data module is operable to evaluate the quantitative data by:

calculating a metric value from the quantitative data according to a formula associated with a metric;

comparing the metric value to at least one threshold value associated with the metric; and determining a quantitative data rating in response to the comparison.

14. The system of claim 13, wherein the at least one threshold value comprises a minimum threshold value.

15. The system of claim 13, wherein the at least one threshold value comprises a maximum threshold value.

16. The system of claim 13, wherein the at least one threshold value comprises a target threshold value.

17. The system of claim 11, wherein the client data module is operable to evaluate the client data by:

selecting the client data comprising a plurality of responses describing an attribute of the provider; and repeating the following until a ranking is made, starting from a highest rating and ending with a lowest rating:
selecting a rating; and
ranking the attribute according to the selected rating if at least a target percentage of the selected responses is associated with the selected rating or with a higher rating.

18. The system of claim 11, wherein the data reporter is operable to:

determine a status indicator associated with the at least one client data rating, the status indicator being a member of a set of status indicators, each status indicator associated with a rating status and having a distinct color; and display the determined status indicator.

19. The system of claim 11, wherein the data reporter is operable to:

determine a status indicator associated with the at least one client data rating, the status indicator being a member of a set of status indicators, each status indicator associated with a rating status and having a distinct shape; and display the determined status indicator.

20. The system of claim 11, wherein the data reporter is operable to:

determine a proportion describing a metric associated with a quantitative data rating; and report the proportion using an indicator having a part proportional to a proportion.

21. A software for processing performance data, comprising:

a computer readable storage medium;

computer software stored on the computer readable storage medium and operable to receive performance data comprising quantitative data gathered according to at least one metric;

evaluate the quantitative data according to the at least one metric to generate at least one quantitative data rating;

receive performance data comprising client data gathered from a client;

evaluate the client data to generate at least one client data rating;

receive performance data comprising provider data gathered from a provider;

evaluate the provider data to generate at least one provider data rating; and report the at least one quantitative data rating, the at least one client data rating, and the at least one provider data rating.

22. The software of claim 21, wherein the logic is operable to report the quantitative data rating and the client data rating by substantially simultaneously displaying the at least one quantitative data rating and the at least one client data rating.

23. The software of claim 21, wherein the logic is operable to evaluate the quantitative data by:

calculating a metric value from the quantitative data according to a formula associated with a metric;

comparing the metric value to at least one threshold value associated with the metric; and determining a quantitative data rating in response to the comparison.

24. The software of claim 23, wherein the at least one threshold value comprises a minimum threshold value.

25. The software of claim 23, wherein the at least one threshold value comprises a maximum threshold value.

26. The software of claim 23, wherein the at least one threshold value comprises a target threshold value.

27. The software of claim 21, wherein the logic is operable to evaluate the client data by:

selecting the client data comprising a plurality of responses describing an attribute of the provider; and repeating the following until a ranking is made, starting from a highest rating and ending with a lowest rating:
selecting a rating; and
ranking the attribute according to the selected rating if at least a target percentage of the selected responses is associated with the selected rating or with a higher rating.

28. The software of claim 21, further operable to:

determine a status indicator associated with the at least one client data rating, the status indicator being a member of a set of status indicators, each status indicator associated with a rating status and having a distinct color; and display the determined status indicator.

29. The software of claim 21, further operable to:

determine a status indicator associated with the at least one client data rating, the status indicator being a member of a set of status indicators, each status indicator associated with a rating status and having a distinct shape; and display the determined status indicator.

30. The software of claim 21, further operable to:

determine a proportion describing a metric associated with a quantitative data rating; and report the proportion using an indicator having a part proportional to a proportion.

31. A system for processing performance data, comprising:

means for receiving performance data comprising quantitative data gathered according to at least one metric;

means for evaluating the quantitative data according to the at least one metric to generate at least one quantitative data rating;

means for receiving performance data comprising client data gathered from a client;

means for evaluating the client data to generate at least one client data rating;

means for receiving performance data comprising provider data gathered from a provider;

means for evaluating the provider data to generate at least one provider data rating; and means for reporting the at least one quantitative data rating, the at least one client data rating, and the at least one provider data rating.

32. A method for processing performance data, comprising:
- defining a service using at least one metric operable to measure the service, the service provided to a client by a provider;
- gathering performance data comprising quantitative data according to the at least one metric;
- evaluating the quantitative data according to the at least one metric to generate at least one quantitative data rating;
- gathering performance data comprising client data from the client;
- evaluating the client data to generate at least one client data rating;
- gathering performance data comprising provider data from the provider;
- evaluating the provider data to generate at least one provider data rating; and
- reporting the at least one quantitative data rating, the at least one client data rating, and the at least one provider data rating.

33. The method of claim 32, wherein gathering performance data comprising client data comprises interviewing a plurality of representatives associated with the client.

34. The method of claim 32, wherein gathering performance data comprising client data comprises responding to a plurality of surveys, the surveys responded to by a plurality of representatives associated with the client.

35. The method of claim 32, further comprising initiating a critical response procedure in response to the reported at least one quantitative data rating and the reported at least one client data rating.

36. A system for processing performance data, comprising:
- a quantitative data database operable to store performance data comprising quantitative data gathered according to at least one metric;
- a quantitative data module coupled to the quantitative data database and operable to:
  - receive the quantitative data; and
  - evaluate the quantitative data according to the at least one metric to generate at least one quantitative data rating;
- a client database operable to store performance data comprising client data gathered from a client;
- a client data module coupled to the client database and operable to:
  - receive the client data;
  - evaluate the client data to generate at least one client data rating; and
- a provider database operable to store performance data comprising provider data gathered from a provider;
- a provider data module coupled to the provider database and operable to:
  - receive the provider data;
  - evaluate the provider data to generate at least one provider data rating; and
- a data reporter coupled to the quantitative data module, the client data module, and the provider data module and operable to report the at least one quantitative data rating, the at least one client data rating, and the at least one provider data rating.

37. The system of claim 36, further comprising:
- a client computer system coupled to the data reporter and operable to display the at least one quantitative data rating, the at least one client data rating, and the at least one provider data rating; and
- a provider computer system coupled to the data reporter and operable to display the at least one quantitative data rating, the at least one client data rating, and the at least one provider data rating.

38. The system of claim 36, wherein the quantitative data module comprises an extractor operable to extract performance data from the quantitative data database.

39. The system of claim 36, wherein the quantitative data module comprises a metric catalog operable to provide information associated with the at least one metric.

40. The system of claim 39, wherein the information comprises a threshold value.

41. The system of claim 36, wherein the quantitative data module comprises a transformer operable to generate the at least one quantitative data rating.

42. The system of claim 36, wherein the quantitative data module comprises a transformer operable to generate the at least one quantitative data rating by:
- calculating a metric value from the quantitative data according to a formula associated with a metric;
- comparing the metric value to at least one threshold value associated with the metric; and
- determining a quantitative data rating in response to the comparison.

43. The system of claim 36, wherein the client data module is operable to generate the at least one client data rating by:
- selecting the client data comprising a plurality of responses describing an attribute of the provider; and
- repeating the following until a ranking is made, starting from a highest rating and ending with a lowest rating:
  - selecting a rating; and
- ranking the attribute according to the selected rating if at least a target percentage of the selected responses is associated with the selected rating or with a higher rating.

* * * * *